(12) United States Patent  
Carruthers (10) Patent No.: US 10,834,169 B2  
(45) Date of Patent: Nov. 10, 2020

(54) SYSTEM AND METHOD OF COMMUNICATING WITH AND CONTROLLING A TEST DEVICE

(71) Applicant: EXFO Inc., Quebec (CA)

(72) Inventor: David Carruthers, L'Ancienne-Lorette (CA)

(73) Assignee: EXFO Inc., Quebec (CA)

( * ) Notice: Subject to any disclaimer, the term of this patent is extended or adjusted under 35 U.S.C. 154(b) by 172 days.

(21) Appl. No.: 15/255,199

(22) Filed: Sep. 2, 2016

(65) Prior Publication Data

US 2017/0237800 A1 Aug. 17, 2017

Related U.S. Application Data

(60) Provisional application No. 62/296,334, filed on Feb. 17, 2016.

(51) Int. Cl.
| | |
|---|---|
| *H04L 29/08* | (2006.01) |
| *G06F 11/30* | (2006.01) |
| *H04W 84/12* | (2009.01) |
| *H04L 29/06* | (2006.01) |
| *H04W 4/80* | (2018.01) |

(52) U.S. Cl.
CPC ........ *H04L 67/025* (2013.01); *G06F 11/3006* (2013.01); *H04L 67/141* (2013.01); *H04L 67/42* (2013.01); *H04W 4/80* (2018.02); *H04W 84/12* (2013.01)

(58) Field of Classification Search
CPC . H04L 67/025; H04L 67/141; G06F 3/04842; G06F 3/04847; G06F 11/3006
See application file for complete search history.

(56) References Cited

U.S. PATENT DOCUMENTS

| 6,442,714 | B1 | 8/2002 | Griffin et al. | |
|---|---|---|---|---|
| 7,010,757 | B2 | 3/2006 | Stana et al. | |
| 8,112,669 | B2 | 2/2012 | Zimmerman | |
| 8,712,408 | B2 | 4/2014 | Tsurutome et al. | |
| 8,788,885 | B1 * | 7/2014 | Cook | G06F 11/3668 714/25 |
| 9,712,406 | B2 * | 7/2017 | Chu | H04L 43/065 |
| 2008/0046449 | A1 * | 2/2008 | Lee | G06F 17/30902 |
| 2010/0182438 | A1 † | 7/2010 | Mohammed | |
| 2012/0303768 | A1 | 11/2012 | Fiennes | |

(Continued)

OTHER PUBLICATIONS

Author Unknown, "Remote Panels in Lab VIEW—Distributed Application Development", Feb. 13, 2013, downloaded from Internet 'http://www.ni.com/tutorial/4791/en/'.

(Continued)

*Primary Examiner* — Angie Badawi  
(74) *Attorney, Agent, or Firm* — Helene Chotard (57) ABSTRACT

System and method for communicating with and controlling a test device. Receiving user input via a system GUI to start a test. In response to the user input, providing by the communication controller a display URL of a resource associated with the test device. Displaying content of the resource nested within the system GUI by a browser. Sending a start instruction to start a test to the test device. Receiving by the communication controller test data from the test device and one of displaying an indication of the test data in the system GUI and storing the test data.

13 Claims, 5 Drawing Sheets

(56) References Cited

U.S. PATENT DOCUMENTS

| | | | |
|---|---|---|---|
| 2013/0080832 A1* | 3/2013 | Dean | G06F 11/3664 |
| | | | 714/32 |
| 2013/0226369 A1 | 8/2013 | Yorio et al. | |
| 2014/0173417 A1† | 6/2014 | He | |
| 2015/0051872 A1* | 2/2015 | Arora | G06F 11/3428 |
| | | | 702/186 |
| 2015/0095717 A1† | 4/2015 | Frenz | |

OTHER PUBLICATIONS

Rowe, Martin, "Mobile apps: The next engineering tool", Test & Measurement World, EDN Network, Dec. 12, 2011.
Forcier, Neil, "Controlling LXI Instrumentation With Smart Devices", May 2011, downloaded from Internet 'www.evaluationengineering.com/search/article.php?aid=3549&nfr=-35714.384321.02'.

\* cited by examiner
† cited by third party

PRIOR ART

SYSTEM AND METHOD OF COMMUNICATING WITH AND CONTROLLING A TEST DEVICE

CROSS-REFERENCE TO RELATED APPLICATIONS

This application claims priority under of U.S. provisional patent application 62/296,334 filed Feb. 17, 2016; the specification of which is hereby incorporated by reference.

TECHNICAL FIELD

The present invention relates generally to communicating with devices, and in particular, to a system and method for controlling a test device.

BACKGROUND OF THE ART

Due to heavy competition in the telecommunication industry, service providers continuously seek ways to reduce both operational and capital expenditures (OPEX and CAPEX). Simplifying network operation, administration and maintenance (OAM), installing cost-effective equipment and maximizing the lifetime of legacy equipment are examples of how CAPEX and OPEX budgets can be reduced. Service providers not only search for ways to minimize costs of network equipment, but also test equipment required for turn-up, monitoring, and troubleshooting their network.

Figure 1:
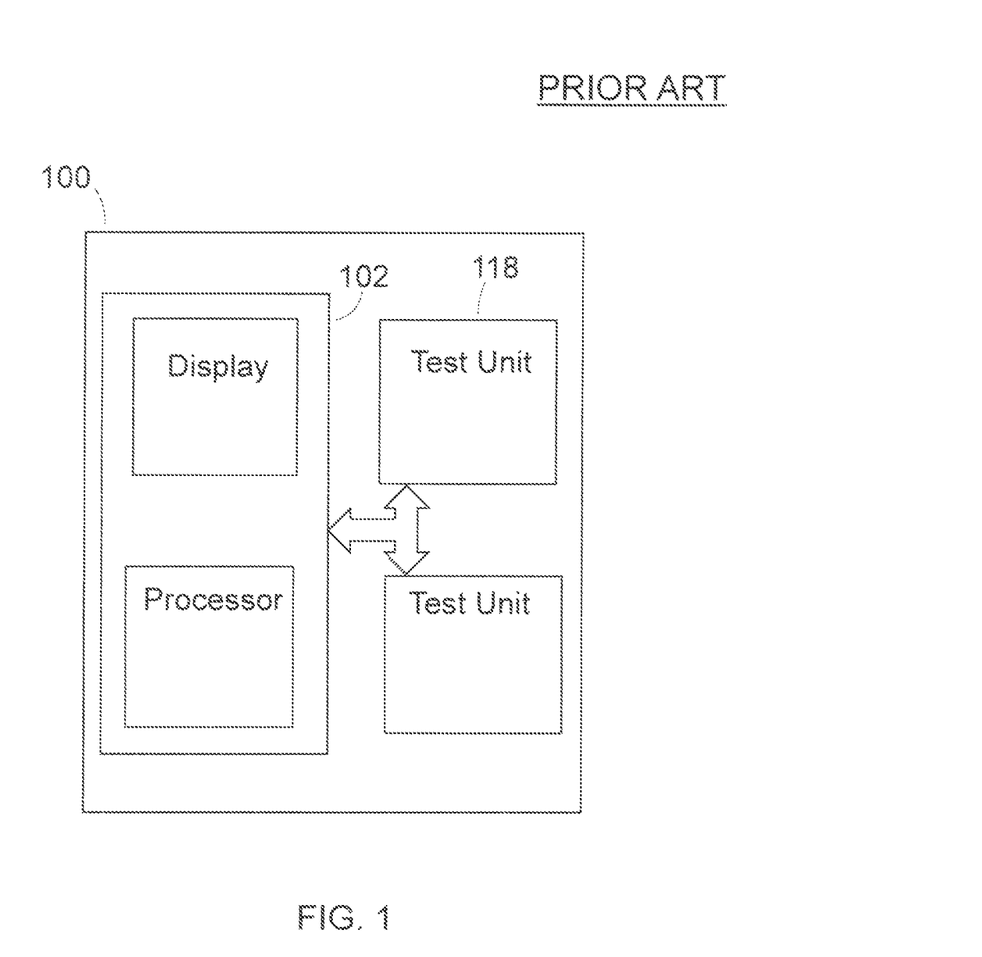
FIG. 1 is a simplified block diagram of a prior art system for testing communication network equipment.

Shown in FIG. 1 is a block diagram of a prior art system for testing equipment of a communication network. Test system 100 supports a variety of test devices communicatively coupled to, and controlled by, a common interface unit 102. Each test device has function-specific hardware and software that often requires configuration data prior to test execution. During operation, a test device executes a test sequence to produce test data and transmits the test data to common interface unit 102. A processor on common interface 102 processes the test data transmitted thereto. A graphical user interface (GUI) for each test is executed on common interface unit 102 and displayed on a display thereof.

The user enters the required configuration data into the GUI of test device 118 and initiates the test therefrom. Initiation of the test by the user triggers the common interface unit 102 to transmit instructions to test device 118 which include configuration data and a command to execute the test. Test device 118 executes a test sequence and transmits test data to common interface unit 102. An indication of the completion of the test is provided to the user via the GUI of test device 118.

In use, a user launches a GUI for each test device in a test system as each test device GUI is generated by a unique software application. Should the user use multiple test devices simultaneously the user must toggle between application windows to gain access to each test device GUI. If a user needs to use test devices of multiple test systems, the user must also use multiple displays—one for each test system. Not only is this inconvenient for the user, having an integrated display in every system adds cost thereto.

Often the user must manually enter a significant amount of complex configuration information into a test device GUI prior to executing a test. In preparation for using a test system the user may manually prepares a test plan comprising a list communication network equipment for test, a list of test devices needed to perform the tests, and any configuration information required by the test devices. Doing so is tedious and prone to human error. Incorrect configuration information can produce inaccurate or incorrect results. Configuration information may need to be re-entered, a test may need to be re-performed, or a problem is undetected.

Overcoming some of the disadvantages of the prior art described above would be advantageous.

SUMMARY

In accordance with an embodiment of the invention there is provided a method comprising displaying a first graphical user interface (GUI) on a display and receiving by a communication controller a first user input via the first GUI, the first user input indicating a first start command. In response to receiving the first user input, providing a first display URL of a first resource associated with a first test device to a browser by the communication controller, sending a first start instruction to the first test device to start a first test, displaying first content of the first resource by the browser, the first content nested within the first GUI, receiving first test data by the communication controller from the first test device and one of storing the first test data by the communication controller and displaying an indication of the first test data in the first GUI.

In accordance with an embodiment of the invention there is provided a device comprising a display for displaying a first graphical user interface (GUI) and a communication controller. The communication controller configured to receive a first user input via the first GUI, the first user input indicating a first start command, in response to receiving the first user input, provide a first display URL of a first resource associated with a first test device, send a first start instruction to the first test device to start a first test, receive first test data by the communication controller from the first test device, one of store the first test data by the communication controller and display an indication of the first test data in the first GUI, and a browser embedded within the communication controller and configured to receive said first display URL and display a content of the first resource nested within the first GUI.

In accordance with an embodiment of the invention there is provided a non-transitory computer readable storage medium with a computer program stored thereon. The computer program is operable to perform the steps of displaying a first graphical user interface (GUI) on a display, receiving by a communication controller a first user input via the first GUI, the first user input indicating a first start command, in response to receiving the first user input, providing by the communication controller a first display URL of a first resource associated with a first test device to a browser, sending a first start instruction to the first test device to start a first test, displaying first content of the first resource by the browser, the first content nested within the first GUI, receiving first test data by the communication controller from the first test device and one of storing the first test data by the communication controller and displaying an indication of the first test data in the first GUI.

BRIEF DESCRIPTION OF DRAWINGS

Further features and exemplary advantages of the present invention will become apparent to the skilled person from the following detailed description, taken in conjunction with the appended drawings, in which:

FIG. 2b is a simplified block diagram of the display of the system of FIG. 2a.

FIG. 3b is a simplified block diagram of the display of the system of FIG. 3a.

It will be noted that throughout the appended drawings, like features are identified by like reference numerals.

DETAILED DESCRIPTION

One or more embodiments disclosed herein provide methods, systems and computer programs for at least one of communicating with and controlling one or more test devices. A test device comprises function-specific instrumentation for at least one of measuring a characteristic of communication network equipment, coupled thereto and testing the performance of communication network equipment coupled thereto. Although 'test' is used as a descriptor of devices throughout this application a test device performing a test may refer to performing a test, taking measurements, collecting test and measurement data, and processing thereof to produce result data.

A test device comprises at least one test interface for coupling the communication network equipment under test thereto. A test device is one of a plurality of test devices of a same type. Whereas a test device type, is one of a plurality of test device types. For example, specific and non-limiting examples of test device types are optical power meters, optical time domain reflectometers (OTDR) and Ethernet testers. In an exemplary embodiment a system comprises a plurality of test devices of the same type. In another exemplary embodiment, a system comprises a plurality of test devices of different types.

In an exemplary embodiment a test device comprises a communication interface for receiving instructions. Some specific and non-limiting examples of instructions include start, to start a test, a request for data, a request for test device status, a request for test status and instructions comprising configuration information. In an exemplary embodiment a test device comprises a communication interface for transmitting information. Some specific and non-limiting examples of information transmitted by the test device include test and measurement data, result data, test device status and test status.

One or more embodiments disclosed herein comprise a memory wherein a memory is a non-transitory computer-readable medium for storing processor-executable instructions and data.

Figure 2A:
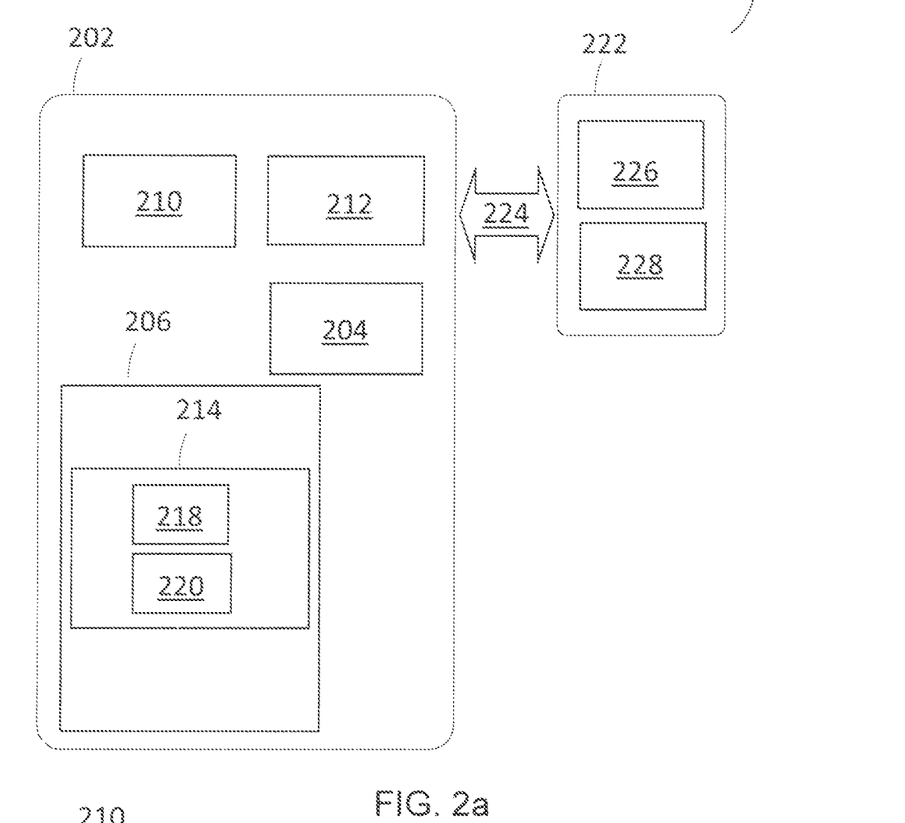
FIG. 2a is a simplified block diagram of a system for communicating and controlling a test device according to an embodiment.

Shown in FIG. 2a is simplified block diagram of a system for communicating with test devices according to an embodiment. System 200 comprises a first device 202 and a second device 222. First device 202 has a processor 204, a memory 206, a display 210 and a user input device 212. Second device 222 is communicatively coupled to first device 202 via a communication network 224 and comprises server 226 and test device 228.

In this example, first device 202 is in the form of a mobile computer device, also referred to herein as a mobile device, for example, a smart phone, a tablet, a laptop computer or the like, and display 210 is in the form of a touchscreen having user input device 212 integrated therein. Although not illustrated in FIG. 2a, second device 222 may comprise one or more test devices and system 200 may comprise a plurality of second devices 222 communicatively coupled thereto. Memory 206 comprises a computer program 214 generating a system GUI 230 and having an embedded browser 218, and a communication controller 220. System GUI 230, shown in FIG. 2b, comprises a plurality of GUI elements for displaying information to the user and for receiving user input therefrom. Some specific and non-limiting examples of GUI elements include text, images, graphics, user input buttons, fields, and forms. Alternatively, display 210 is a non-touch screen and user input device 212 is a keypad. In this example, communication network 224 is a WiFi network. Alternatively, communication network 224 is another type of communication network. Specific and non-limiting examples of communication network 224 include Bluetooth®, Ethernet, wireless Ethernet, 3G, 4G, serial transmission networks such as RS-232, USB, and Firewire.

The user initiates execution of computer program 214 by processor 204. Upon execution of computer program 214, system GUI 230 is generated and displayed on display 210. In an exemplary embodiment a user starts a test by test device 228 via system GUI 230.

The user enters a first user input into system GUI 230 indicating a start command to start a test by test device 228. For example, the user clicks a 'start' button associated with test device 228 within system GUI 230. The first user input is then provided by system GUI 230 to communication controller 220.

Upon receiving the first user input, communication controller 220 sends a start instruction to test device 228 via communication network 224.

Communication controller 220 also sends a request to test device 228 for a display URL specifying a location of a resource associated with test device 228. The resource comprises content for display by browser 212 which is generated and then stored by server 226. For example, the resource is stored in a memory (not shown) on second device 222. In this example, the resource comprises content including a GUI 232 of test device 228. Alternatively, the resource does not comprise a GUI. For example, the resource comprises content for display only such as a video, a picture and test related information. Server 226 provides test device 228 the display URL. In response to receiving display URL, test device transmits the display URL to communication controller 220 via communication network 224. Communication controller 220 then provides the display URL to embedded browser 218.

Communication controller 220 also sends a request to test device 228 for a display URL specifying a location of a resource associated with test device 228. The resource comprises content for display by browser 212 which is generated and then stored by server 226. For example, the resource is stored in a memory on second device 222. In this example, the resource comprises content including a GUI 232 of test device 228. Alternatively, the resource comprises other than a GUI. For example, the resource comprises content for display only such as a video, a picture and test related information. Server 226 provides test device 228 the display URL. In response to receiving display URL, test device transmits the display URL to communication controller 220 via communication network 224. Communication controller 220 then provides the display URL to embedded browser 218.

Figure 2B:
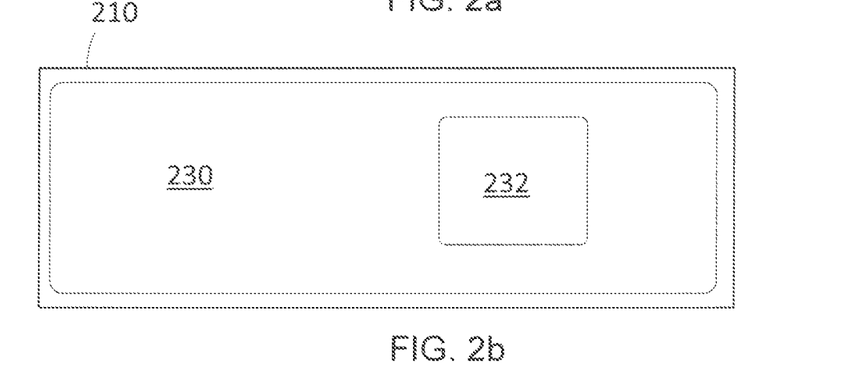

Embedded browser 218 transmits a request to server 226 for content of the resource specified by display URL via communication network 224. Server 226 responds to the request from embedded browser 218 and transmits the content of the resource thereto via communication network 224. Embedded browser 218 displays GUI 232 on display 210 and nested within system GUI 230, as shown in FIG. 2b. GUI 232 comprises a plurality of GUI elements for displaying content to the user and receiving user input therefrom. Some specific and non-limiting examples of GUI elements include text, images, graphics, user input buttons, text fields, and forms.

Optionally, test device 228 generates a resource comprising content having live test information that is being constantly refreshed, for displaying to the user in via system GUI 230. In one embodiment, the content comprises a video stream.

Although system GUI 230 and GUI 232 of test device 228 are generated independently—system GUI 230 is generated by computer program 214 and GUI 232 is generated by server 226, GUI 232 is nested visually within system GUI 230. This provides the user a single interface for accessing and controlling both system GUI 230 and GUI 232 of test device 228.

It should be understood that communication controller sends a request to test device 228 for a display URL specifying a location of a resource associated with test device 228 either prior to or after communication controller 220 sends a start instruction to test device 228.

In another exemplary embodiment, the user starts a test by test device 228 via GUI 232. The user initiates execution of computer program 214 by processor 204. Upon execution of computer program 214, system GUI 230 is generated and displayed on display 210. The user starts a test by test device 228 via system GUI 230. The user enters a first user input into system GUI 230 indicating a start command. For example, the user clicks a 'start' button associated with test device 228 within system GUI 230. The first user input is then provided by system GUI 230 to communication controller 220.

Upon receiving the first user input, communication controller 220 sends a request to test device 228 for a display URL specifying a location of a resource associated with test device 228. The resource comprises content for display by browser 212 which is generated and then stored by server 226. For example, the resource is stored in a memory on second device 222. In this example, the resource comprises content including a GUI 232 of test device 228. Server 226 provides test device 228 the display URL. In response to receiving display URL, test device transmits the display URL to communication controller 220 via communication network 224. Communication controller 220 then provides the display URL to embedded browser 218.

Embedded browser 218 transmits a request to server 226 for content of the resource specified by display URL via communication network 224. Server 226 responds to the request from embedded browser 218 and transmits the content thereto via communication network 224. Embedded browser 218 displays GUI 232 on display 210 and nested within system GUI 230, as shown in FIG. 2b. GUI 232 comprises a plurality of GUI elements for displaying content to the user and receiving user input therefrom. Some specific and non-limiting examples of GUI elements include text, images, graphics, user input buttons, text fields, and forms.

The user enters a second user input in GUI 232 indicating a start command to start a test by test device 228. For example, the user clicks a 'start' button within system GUI 232. The embedded browser 218 sends the second user input to server 226. In response to receiving the second user input indicating a start command, server 226 provides a start instruction to test device 228.

Test device 228 starts a test upon receipt of the start instruction from server 226. Upon completion of the test, test device 228 transmits to communication controller 220 via communication network 224 test dependent information including one of measurement data, result data, test status data, and other test related information. An example of test related information is an indication of the success or failure of the test. In an exemplary embodiment, communication controller 220 stores test dependent information received from test device 228 in a memory of first device 202 for future use. An indication of completion of test is provided to the user in system GUI. For example, a message, 'Test Completed' appears within system GUI 230 on display 210. Optionally, other information related to the test is provided to the user via system GUI 230.

Although system GUI 230 and GUI 232 of test device 228 are generated independently—system GUI 230 is generated by computer program 214 and GUI 232 is generated by server 226, GUI 232 is nested visually within system GUI 230. This provides the user a single interface for accessing both system GUI 230 and GUI 232 of test device 228.

Figure 3A:
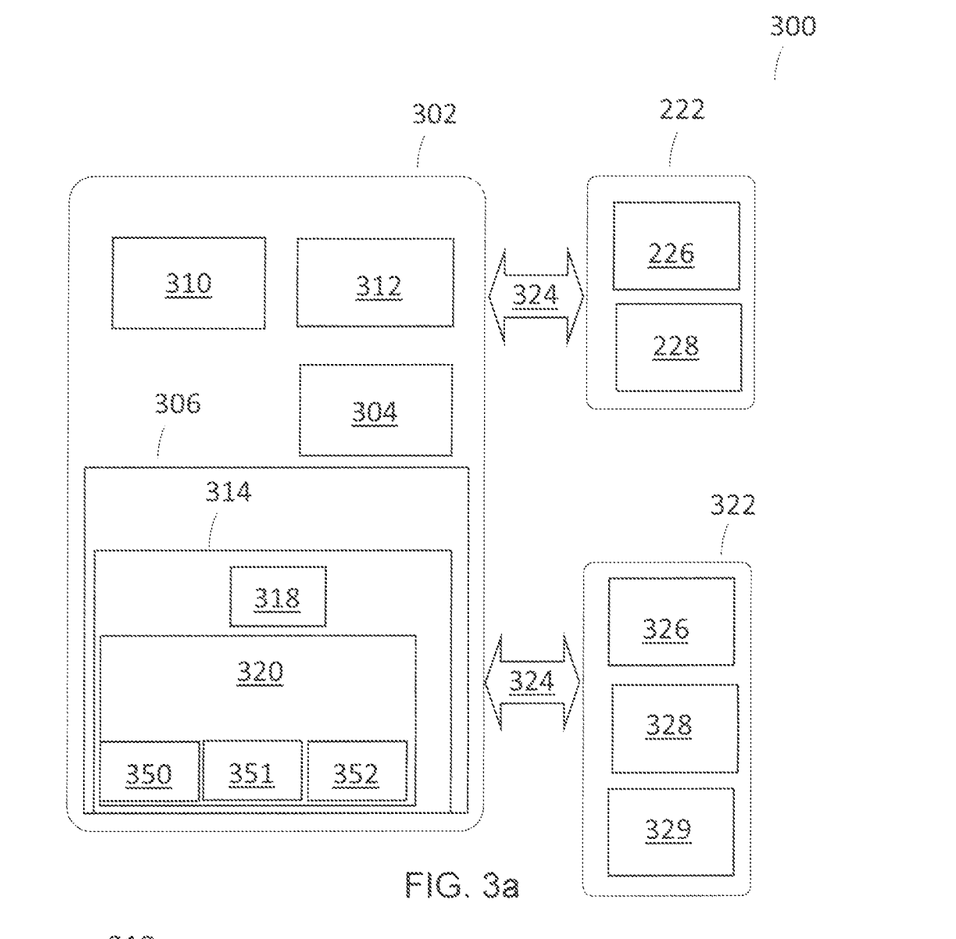
FIG. 3a is a simplified block diagram of a system for communicating and controlling a plurality of test devices according to an embodiment.

Now referring to FIG. 3a, shown is a simplified block diagram of a system according to an embodiment. System 300 comprises first device 302, having a processor 304, memory 306, display 310, and user input device 312. System 300 also comprises second device 222, as described above, and third device 322 comprising server 326, and test devices 328 and 329 wherein each test device is a unique device type. First device 302 is communicatively coupled to second device 222 and third device 322 via a communication network 324. In this example first device 302 is in the form of a mobile device and display 310 is in the form of a touchscreen having a user input device 312 integrated therein. Memory 306 comprises a computer program 314 having an embedded browser 318, a communication controller 320 and generates a system GUI 330. Optionally, second device 322 comprises more than two test devices. Optionally, system 300 comprises a plurality of devices each comprising a server and at least one test device. In this example, communication network 324 is a WiFi network. Alternatively, communication network 324 is another type of communication network. Specific and non-limiting examples of communication network 324 include Bluetooth®, Ethernet, wireless Ethernet, 3G, 4G, serial transmission networks such as RS-232, USB, and Firewire.

Figure 3B:
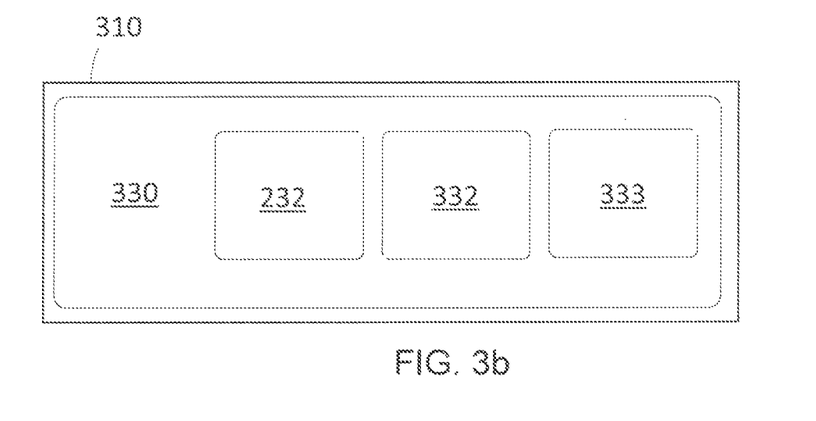

System GUI 330, shown in FIG. 3b, comprises a plurality of GUI elements for displaying information to the user and for receiving user input therefrom. Some specific and non-limiting examples of GUI elements include text, images, graphics, user input buttons, text fields, and forms. Alternatively, display 310 is a non-touch screen and user input device 314 is a keypad. Alternatively, first device 302 is a computer.

Each of test devices 228, 328 and 329 is a different type of test device supporting a unique set of communication instructions and optionally unique configuration parameters. Specific and non-limiting examples of unique configuration parameters includes a wavelength for test for an optical power meter and an acceptable bit error rate for a bit error rate tester.

In this embodiment, communications controller 320 comprises plug-in modules 350, 351, and 352, each of which communicates with test devices 228, 328 and 329 respectively. In an exemplary embodiment, modules 350, 351 and 352 are added to system 300 via installation of test device type-specific plug-ins that link to computer program 314 during execution. Plug-ins expand the functionality of computer programs, for example, remote sensing applications use plug-ins to process data from different sensor types, graphics software use plug-ins to support file formats and process images, and packet sniffers use plug-ins to decode packet formats. is an example of such packet sniffers.

If a test device-specific plug-in associated with a test device of system 300 is not stored in memory 306, the user can download the plug-in thereto. In future, a new test device of a new test device type can be added and supported by system 300 provided the user downloads the test device-specific plug-in associated therewith.

In an exemplary embodiment a user initiates execution of computer program 314 by processor 304. Upon execution of computer program 314, system GUI 330 is generated and displayed on display 310. GUI 330 provides the user a means to start a test by any of test devices 228, 328 or 329. For example, a 'start' button associated with each of test devices 228, 328 and 329 is displayed within GUI 330.

In this embodiment, the user enters a first user input into system GUI 330 indicating a start command to start a test by test device 328. For example, the user clicks a 'start' button associated with test device 328 within system GUI 330. The first user input is then provided by system GUI 330 to plug-in module 351.

Test device 328 executes a test upon receipt of the start instruction from plug-in module 351. Once the test is completed, test device 328 transmits to plug-in module 351 via communication network 324 at least one of measurement data, result data, test status data, for example an indication of the success or failure of the test or other data reflecting the status of the test. In an exemplary embodiment, plug-in module 351 stores status information as well as other data received from test device 328 in a memory, for example memory 314, for future use. An indication of completion of test is provided to the user in system GUI 330. For example, a message, 'Test Completed' appears within system GUI 330 on display 310. Optionally, other information related to the test is provided to the user via system GUI 330.

Plug-in module 351 also sends a request to test device 328 via communications network 324 for a display URL specifying a location of a resource of test device 328. The resource comprises content for display by browser 312 which is generated and stored by test device 328 in a location retrievable by server 326. For example, the resource is stored in a memory (not shown) included in second device 322. In this embodiment, the resource comprises content including GUI 332 of test device 328. Test device 328 transmits display URL to plug-in module 351 via communication network 324. Once received, plug-in module 351 provides the display URL to embedded browser 318.

Embedded browser 318 transmits a request to server 326 for content of the resource specified by display URL via communication network 324. Server 326 responds to the request from embedded browser 318 and transmits the content thereto via communication network 324. Embedded browser 318 displays GUI 332 on display 310 and nested within system GUI 330, as shown in FIG. 3b. GUI 332 comprises a plurality of GUI elements for displaying content to the user and receiving user input therefrom. Some specific and non-limiting examples of GUI elements include text, images, graphics, user input buttons, text fields, and forms.

Although system GUI 330 and GUI 332 of test device 328 are generated independently—system GUI 330 is generated by computer program 314 and GUI 232 is generated by server 326, GUI 332 is nested visually within system GUI 330. This provides the user a single interface for accessing both system GUI 330 and GUI 332 of test device 328. System 300 provides a user a single interface to access and control of a plurality of test devices.

In an exemplary embodiment, the content of only one resource associated with one test device is displayed within a system GUI. For example, system GUI 330 has a portion reserved for displaying the content of one of the resources associated with test devices 228, 328 and 339. System GUI 330 has nested therein only one of GUI 232, GUI 332 and window 333 at a time.

As server-browser communication is platform independent, an operating system of a first device and a test device need not be the same for interoperability. For example, mobile device may run on iOS® and the test device runs on Windows® or vice versa.

The user initiates execution of computer program 314 by processor 304. Upon execution of computer program 314, system GUI 330 is generated and displayed on display 310. In an exemplary embodiment a user starts a test by test device 328 via GUI 332. The user enters a first user input into system GUI 330 indicating a start command to start a test by test device 328. For example, the user clicks a 'start' button associated with test device 328 within system GUI 330. The first user input is then provided by system GUI 330 to communication controller 320.

Upon receiving the first user input, communication controller 220 sends a request to test device 328 for a display URL specifying a location of a resource associated with test device 228. The resource comprises content for display by browser 312 which is generated and then stored by server 326. For example, the resource is stored in a memory (not shown) on second device 322. In this example, the resource comprises content including a GUI 332 of test device 328. Server 326 provides test device 328 the display URL. In response to receiving display URL, test device 328 transmits the display URL to communication controller 320 via communication network 324. Communication controller 320 then provides the display URL to embedded browser 318.

Embedded browser 318 transmits a request to server 326 for content of the resource specified by display URL via communication network 324. Server 326 responds to the request from embedded browser 318 and transmits the content thereto via communication network 324. Embedded browser 318 displays GUI 332 on display 310 and nested within system GUI 330, as shown in FIG. 3b. GUI 332 comprises a plurality of GUI elements for displaying content to the user and receiving user input therefrom. Some specific and non-limiting examples of GUI elements include text, images, graphics, user input buttons, text fields, and forms.

The user enters a second user input in GUI 332 indicating a start command to start a test by test device 328. For example, the user clicks a 'start' button within system GUI 332. The embedded browser 318 sends the second user input to server 326. In response to receiving the second user input indicating a start command, server 326 provides a start instruction to test device 328.

Test device 328 starts a test upon receipt of the start instruction from server 326. Upon completion of the test, test device 328 transmits to communication controller 320 via communication network 324 test dependent information including one of measurement data, result data, test status data, and other test related information. An example of test related information is an indication of the success or failure of the test. In an exemplary embodiment, communication controller 320 stores test dependent information received from test device 328 in a memory of first device 302 for future use. An indication of completion of test is provided to the user in system GUI. For example, a message, 'Test Completed' appears within system GUI 330 on display 310. Optionally, other information related to the test is provided to the user via system GUI 330.

The user may also start a test by test device 228 in the same manner. For example, the system GUI 330 includes a 'start' button associated with each of test device 228 and 329 respectively. In this case, plug-in module 350 communicates with test device 228 and browser 312 communicates with server 226.

The user may also start a test by test device 329 in the same manner. In this case, plug-in module 352 communicates with test device 329 and browser 318 communicates with server 326.

Still referring to FIG. 3a, in another exemplary embodiment, a resource is not generated by server 326 when a test is started on test device 329. The user enters a first user input into system GUI 330 indicating a start command for starting a test by test device 329, For example, the user clicks a 'start' button associated with test device 329 within system GUI 330. The first user input is then provided by system GUI 330 to plug-in module 352.

Upon receiving the second user input, plug-in 351 sends a start instruction to the test device 329 via communication network 324. Test device 329 executes a test upon receipt of the start instruction from plug-in module 351. Once the test is completed, test device 329 transmits to plug-in module 352 via communication network 324 at least one of measurement data, result data, test status data, for example an indication of the success or failure of the test or other data reflecting the status of the test. In an exemplary embodiment, plug-in module 352 stores status information and other data received from test device 329 in memory for future use. An indication of completion of test is provided to the user in system GUI 330. For example, a message, 'Test Completed' appears within system GUI 330 on display 310. Optionally, other information related to the test is provided to the user via system GUI 330.

Plug-in 351 does not send a request for a display URL to test device 329. Plug-in 351 provides a display URL to embedded browser 318, the display URL specifying a resource that is local to device 302. For example, the URL comprises a pathname to a file stored in a memory of device 302. Browser 318 displays the content of the file in a window 333 within GUI 330. Specific and non-limiting examples of content displayed to the user are text 'Please follow instructions displayed on test device,' 'Please perform manual operations on unit' and 'No GUI Available.'

Figure 4:
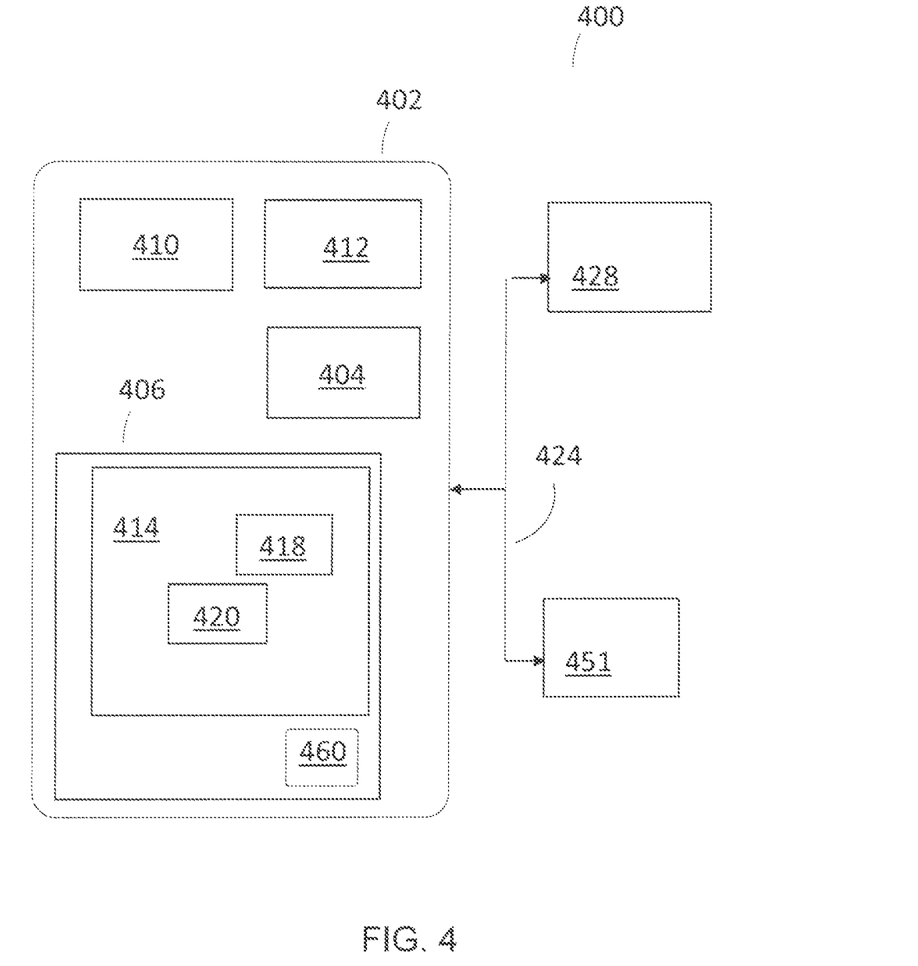
FIG. 4 is a simplified block diagram of a system having a configuration file for configuring a plurality of test devices according to an embodiment.

Shown in FIG. 4 is simplified block diagram of a system according to an embodiment. System 400 comprises a first device 402 communicatively coupled test device 428 and test device 451 via communication network 424. System 400 also comprises a configuration file 460 stored in memory 406 comprising a list of test devices for use by the user and associated configuration information required thereby.

For example, a user or a higher-level manager or management system creates configuration file 460 prior to use of system 400. The user launches computer program 406, a system GUI is displayed on display 410. Configuration file 460 is processed by computer program 406 whereby the list of test devices and associated configuration data is extracted. The test devices listed in the configuration file are indicated in the system GUI. For example, a button for starting a test by each test device is displayed therein. When a user starts a test on a test device configuration information for each test device is transmitted thereto by communication controller 420 via communication network 424.

Figure 5A:
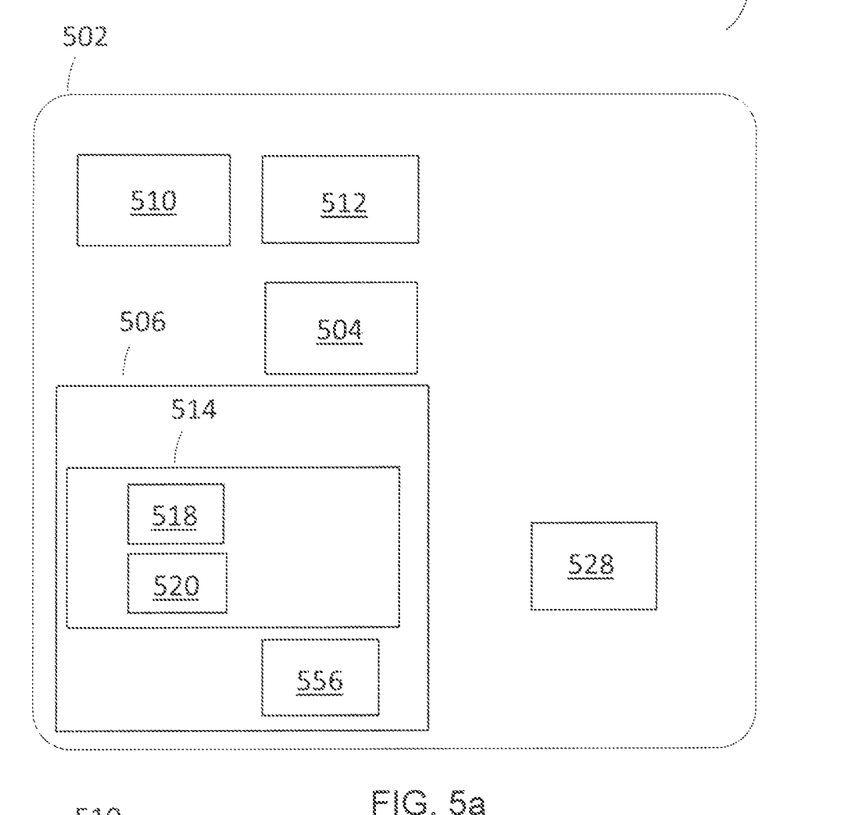
FIG. 5a is a simplified block diagram of an integrated system according to an embodiment.
Figure 5B:
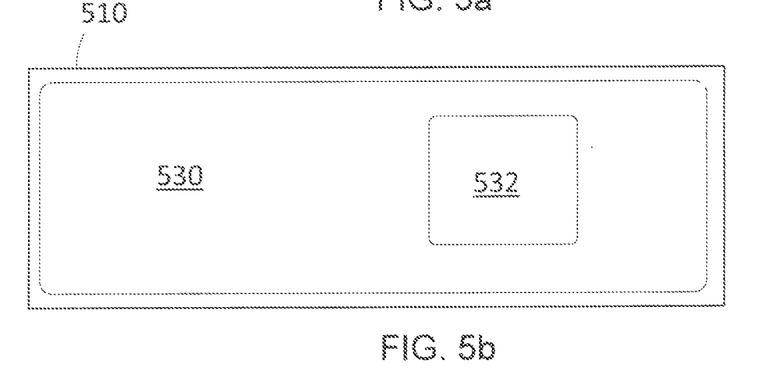
FIG. 5b is a simplified block diagram of the display of the system of FIG. 5b.

Shown in FIG. 5 is a simplified block diagram of a system 500 according to another embodiment. System 500 comprises a device 502 having integrated therein a processor 504, memory 506, display 510, user input device 512, server 556 and test device 528. Memory 506 comprises a computer program 514 having an embedded browser 518 and a communication controller 520. It should be understood that the system 500 is similar to system 200 of FIG. 2 apart from the fact that, in system 500, first device 202 and second device 222 are merged together and share a same processing unit 504, so that the server 556 is actually located in device 502. In this case, no communication network is required for communication between a first device and a second device since they are integrated with one another. Apart from those differences, the system 500 is very similar to system 200 of FIG. 2 and similar features and its operation will not be repeatedly described. Computer program 514 generates a system GUI upon execution thereof by processor 504. Alternatively, test device 528 is not integrated in device 502 and is communicatively coupled to device 502 via a communication network or communication bus.

The embodiments described above are intended to be exemplary only. The scope of the invention is therefore intended to be limited solely by the appended claims.

What is claimed is:

1. A method for a first device comprising a display, a communication controller comprising a test device-specific plug-in and a browser embedded within the communication controller to control and communicate with a test device, the test device being comprised in a second device comprising the test device and a server, the method comprising:

displaying a first graphical user interface (GUI) on the display of the first device, the first GUI comprising the communication controller and the embedded browser;

receiving by the communication controller plug-in, a first user input via the first GUI of the first device, the first user input indicating a first start command;

in response to receiving the first user input, the communication controller plug-in of the first device sending a request to the test device of the second device for a URL specifying a location of a resource associated with the test device, wherein the resource comprises a test device GUI;

the communication controller plug-in of the first device receiving the URL from the test device of the second device;

the plug-in providing the URL to the browser;

using the URL, the browser retrieving from the server of the second device, the resource comprising the test device GUI;

the browser displaying the test device GUI on the display of the first device, the test device GUI nested within the first GUI, wherein the test device GUI has GUI elements for receiving user input to control function-specific instrumentation of the test device for executing at least one of measuring a characteristic and testing a performance of communication network equipment coupled to the test device, and wherein controlling comprises configuring the function-specific instrumentation and launching execution on the function-specific instrumentation from the test device GUI of the first device;

receiving, in the test device GUI displayed on the display of the first device, a second user input indicating a second start command to start a first test by the test device;

in response to receiving the second user input, sending a first start instruction to the test device to start the first test;

the plug-in receiving from the test device, first test data produced by the test device; and one of storing the first test data by the plug-in and displaying an indication of the first test data in the first GUI;

whereby the function-specific instrumentation of the test device is controlled via the test device GUI displayed on the first device; and wherein said first device is configured to control and communicate with a plurality of said test devices, and comprises a plurality of said plug-in configured for function-specific instrumentations of the corresponding test devices, said test devices having mutually-different function-specific instrumentations.

2. The method according to claim 1, further comprising: generating the test device GUI by the server; and
transmitting the test device GUI by the server to the browser.

3. The method according to claim 2 wherein sending the first start instruction to the test device comprises:
sending the second user input to the server by the browser; and
in response to receiving the second user input indicating the second start command,
sending the first start instruction by the server to the test device.

4. The method according to claim 1 wherein sending the first start instruction to the test device comprises the plug-in sending the first start instruction to the test device.

5. The method according to claim 4 wherein the first URL of the resource is a relative URL.

6. The method according to claim 4, further comprising: in response to receiving the first start instruction to start the first test,
executing the first test by the test device.

7. The method according to claim 6, further comprising:
the plug-in receiving a third user input via the test device GUI, the third user input indicating a third start command;
in response to receiving the third user input, the plug-in providing a second URL of a second resource associated with a second test device to the browser, the second resource comprising a second test device GUI having GUI elements for receiving user input;
sending a second start instruction to the second test device to start a second test;
displaying second test device GUI by the browser, nested within the first GUI;
the plug-in receiving second test data from the second test device; and
one of storing the second test data by the plug-in and displaying an indication of the second test data in the first GUI.

8. The method according to claim 7, further comprising:
the plug-in sending a request for the second URL to the second test device;
the plug-in receiving the second URL from the second test device;
generating the second test device GUI by the server; and
transmitting the second test device GUI by the server to the browser.

9. The method according to claim 7 wherein sending the second start instruction to the second test device comprises the plug-in sending the second start instruction to the second test device.

10. The method according to claim 7, further comprising:
the plug-in sending a request for the second URL to the second test device;
the plug-in receiving the second URL from the second test device;
generating the second test device GUI by a second server; and
transmitting the second test device GUI by the second server to the browser.

11. The method according to claim 1, further comprising retrieving data from a data file and transmitting configuration data to the test device.

12. A first device to control and communicate with a test device, the test device being comprised in a second device comprising the test device and a server, the first device comprising:
a display comprising a display screen for displaying a first graphical user interface (GUI), the first GUI comprising an embedded browser and a communication controller comprising a test device-specific plug-in; and
a processor executing the browser and the communication controller,
the plug-in being configured to:
receive a first user input via the first GUI, the first user input indicating a first start command,
in response to receiving the first user input, send a request for a URL to the test device of the second device, the URL specifying a location of a resource associated with the test device, wherein the resource comprises a test device GUI;
receiving the URL from the test device of the second device;
provide the URL to the browser,
receive, in the test device GUI displayed on the display of the first device, a second user input indicating a second start command to start a first test by the test device;
in response to receiving the second user input, send a first start instruction to the test device to start the first test;
receive from the test device, first test data produced by the test device,
one of store the first test data by the communication controller and display an indication of the first test data in the first GUI; and
the browser being configured to:
receive said URL; and
display the test device GUI nested within the first GUI on the display of the first device, wherein the test device GUI has GUI elements for receiving user input to control function-specific instrumentation of the test device for executing at least one of measuring a characteristic and testing a performance of communication network equipment coupled to the test device, wherein controlling comprises configuring the function-specific instrumentation and launching execution on the function-specific instrumentation from the test device GUI of the first device;

whereby the function-specific instrumentation of the test device is controlled via the test device GUI displayed on the first device; and wherein said first device is configured to control and communicate with a plurality of said test devices, and comprises a plurality of said plug-in configured for function-specific instrumentations of the corresponding test devices, said test devices having mutually-different function-specific instrumentations.

13. A non-transitory computer readable storage medium with a computer program stored thereon, wherein the computer program comprises a browser and at least one communication controller plug-in residing on a first device, to control and communicate with a test device, the test device being comprised in a second device comprising the test device and a server, computer program being operable to perform the steps of:

displaying a first graphical user interface (GUI) on a display of the first device, the first GUI comprising the communication controller and the embedded browser;

receiving by the communication controller plug-in, a first user input via the first GUI of the first device, the first user input indicating a first start command;

in response to receiving the first user input, sending, by the communication controller plug-in in the first device, a request to the test device of the second device for a URL specifying a location of a resource associated with the test device wherein the resource comprises a test device GUI;

receiving, by the communication controller plug-in in the first device, the URL from the test device of the second device;

the plug-in providing the URL to the browser;

using the URL, the browser retrieving the resource comprising the test device GUI from the server of the second device;

displaying the test device GUI by the browser, the test device GUI nested within the first GUI, wherein the test device GUI has GUI elements for receiving user input to control function-specific instrumentation of the test device for executing at least one of measuring a characteristic and testing a performance of communication network equipment coupled to the test device, wherein controlling comprises configuring the function-specific instrumentation and launching execution on the function-specific instrumentation from the test device GUI of the first device;

receiving, in the test device GUI displayed on the display of the first device, a second user input indicating a second start command to start a first test by the test device;

in response to receiving the second user input, sending a first start instruction to the test device to start the first test;

receiving via the plug-in from the test device, first test data produced by the test device; and one of storing the first test data by the plug-in and displaying an indication of the test data in the first GUI;

whereby the function-specific instrumentation of the test device is controlled via the test device GUI displayed on the first device.

* * * * *